June 12, 1956 E. LATTA 2,750,550
SWITCH CONSTRUCTION, AND MOTOR CONTROL
SYSTEM INCORPORATING THE SAME
Filed March 12, 1953 2 Sheets-Sheet 1

INVENTOR.
EDWARD LATTA
BY
James and Franklin
ATTORNEY

INVENTOR.
EDWARD LATTA
BY
ATTORNEY

United States Patent Office 2,750,550
Patented June 12, 1956

2,750,550

SWITCH CONSTRUCTION, AND MOTOR CONTROL SYSTEM INCORPORATING THE SAME

Edward Latta, Owosso, Mich., assignor to Redmond Company, Inc., Owosso, Mich., a corporation of Michigan Application March 12, 1953, Serial No. 341,984

19 Claims. (Cl. 318—265)

The present invention relates to a novel switch construction adapted to close a circuit during movement of a driven element in one direction and to open a circuit at a predetermined point or points in the range of movement of the driven element when it is moved in the opposite direction. The invention also relates to a motor control system into which said switch is incorporated.

The switch and motor control system of the present invention are particularly well adapted for use in conjunction with a windshield wiper arrangement which is driven by a reversible electric motor and which provides for parking the windshield wiper blades in a position beyond their normal range of wiping movement, preferably against the lower edge of the windshield, in order that they should not interfere with the visibility of the driver when they are not in use. Mechanically, this result may be achieved by utilizing a direction-sensitive linkage between the driving motor and the wiper blades such that the length of a connecting arm between the driving element and the blades is varied when the direction of rotation of the motor is reversed. In order for such a direction-sensitive linkage to perform its desired link-lengthening function, it is necessary that it be moved through a predetermined portion of its range of movement, and even perhaps through a complete cycle of operation, in reverse.

It is also essential, if the wiper blades are to be parked at the desired place on the windshield, that the driving motor should be de-energized or stopped when the blades are at or very closely adjacent to that desired point. Consequently it is necessary, when the driving motor is reversed, to permit it to move in that reversed direction until the wiper blades are in that desired position, and it is further necessary that the motor be rotated in said reversed direction for a sufficient period of time for the direction-sensitive linkage to function. It would be possible, of course, to have these operations performed under manual control, the operator reversing the motor and then, when the blades are in their desired position, performing another operation to stop the motor. From a psychological and commercial point of view, this is not feasible. Operators of motor vehicles, used to the conventional windshield wiper drive in which the blades are parked through a single manipulation of a control switch, will not accept a more complex mode of operation. Consequently means must be provided for automatically attaining the desired result through but a single manual operation. The present switch, and the motor control system into which it is incorporated, permit that result to be achieved when the operator throws the motor control switch to "reverse."

While the present invention is here described specifically in connection with such a windshield wiper drive, it will be apparent that it may be utilized in any other environment in which the same or comparable results are desired, that is to say, in which cyclical operation in a "forward" direction is to continue uninterrupted, and in which reverse operation is to continue over at least a predetermined portion of the cycle and is to be terminated at a particular point or points in the cycle.

The switch comprises a pair of relatively movable conductive members, here shown in the form of a segment and a wiper arm movable thereover, to which separate electrical connections lead. When the arm and segment are in engagement the circuit through the switch is closed. When the arm has moved off of the segment that electrical circuit is broken. A driving element is operatively connected to the system which is to be controlled and is moved thereby in a direction corresponding to the direction of movement of the operative parts of that system. The wiper arm is connected to the driving element in a releasable manner and means are provided for positively restraining the movement of the wiper arm after it has moved onto the segment and along the segment to a predetermined degree. When this last mentioned means is operative on the wiper arm to hold it against rotation, the operative connection between that arm and the driving element yields, permitting the driving element to continue to move in its "forward" direction independently of the wiper arm, the circuit through the switch remaining closed. The length of the conductive segment over which the wiper arm is caused to travel before it is positively held against further movement is determined by the desired amount of movement of the system in reverse. When that system is reversed, the driving element will also move in reverse direction and will, either immediately or at an appropriate point in its reverse movement, pick up the wiper arm, re-establish the operative connection between itself and the wiper arm, and cause the wiper arm to move in the opposite direction along the segment and eventually off of the segment. When the wiper arm leaves the segment the circuit through the switch is broken. If that circuit is in series with the motor the motor will then stop.

The specific embodiment of the switch here disclosed permits the attainment of the above mode of interaction in a simple and inexpensive yet dependable manner. The operative parts are easily fabricated and assembled. In addition, the conductive segment is mounted in the housing in such a way that its position relative to the wiper arm may be varied, thus providing for ready adjustability of the specific point in the cycle of operation of the system to which the circuit through the switch is broken.

To the accomplishment of the above and to such other objects as may hereinafter appear, the present invention relates to a switch construction and to a motor control system incorporating said switch, as defined in the appended claims and as described in this specification, taken together with the accompanying drawings in which:

Figure 1:
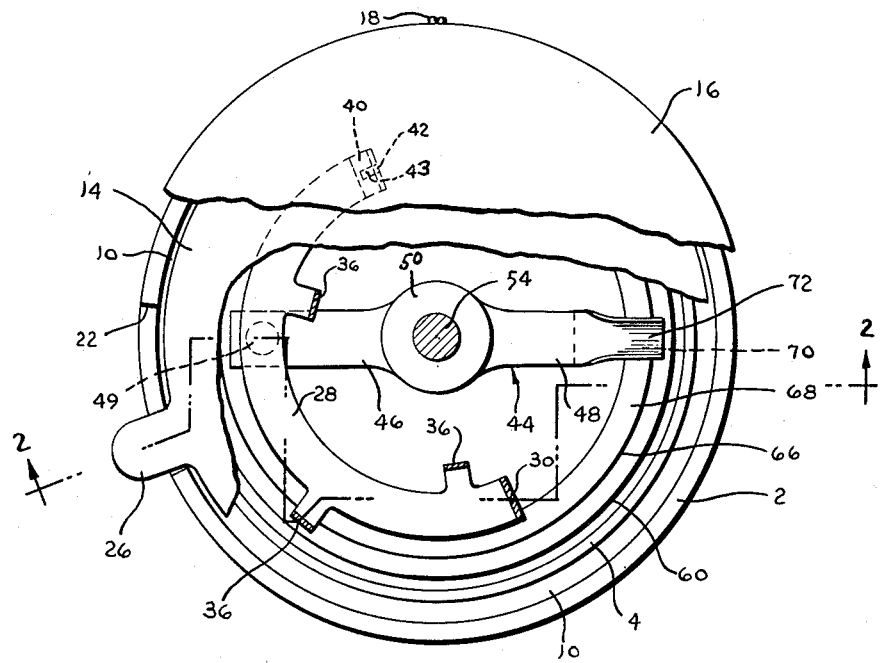
Fig. 1 is a top plan view, partially broken away, of the switch of the present invention.
Figure 2:
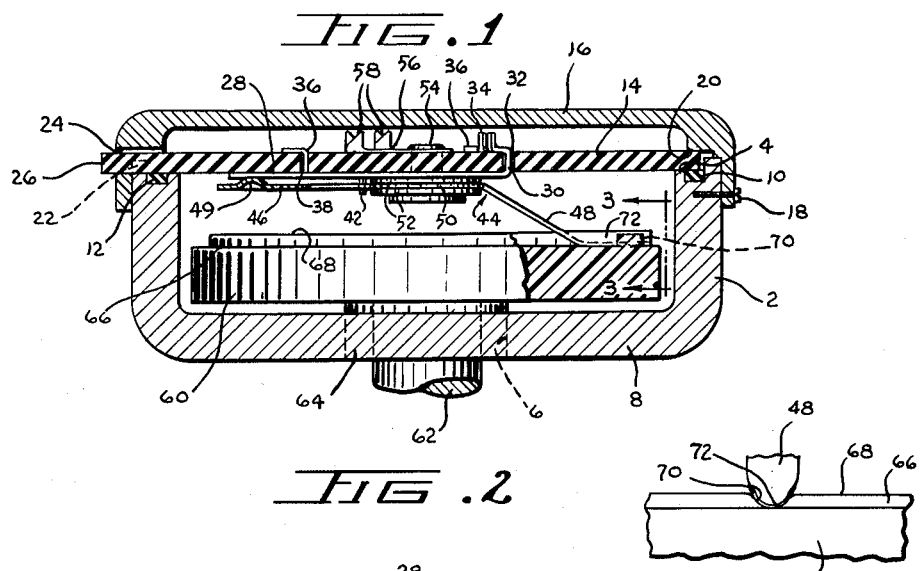
Fig. 2 is a cross sectional view taken along the line 2—2 of Fig. 1.
Figure 3:
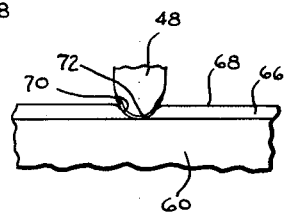
Fig. 3 is a fragmentary side elevational view taken along the line 3—3 of Fig. 2.

The switch, in the embodiment here specifically illustrated, comprises a cup-shaped bottom housing part 2 having an upper edge 4 and a central aperture 6 in its lower wall 8. The upper edge 4 is recessed at 10 and a gasket 12 is mounted therein so as to project thereabove for a small distance. A plate 14 of insulating material rests on the upper edge 4 and overlies the gasket 10. A cover 16 is provided, secured to the bottom housing part 2 in any conventional manner, as by means of the screws 18, and has a lower edge 20 which engages the upper surface of the insulating plate 14 and presses that plate down upon the gasket 10, thus compressing the gasket, substantially sealing the interior of the housing, and holding the plate 14 in place. The rim of the bottom housing part 2 and the rim of the cover 16 are provided with registering slots 22 and 24 through which an ear 26 on the plate 14 projects. The slots 22 and 24 are considerably longer than the width of the ear 26, the ear 26 thus being slidable through the slots so as to adjust or vary the rotative position of the plate 14 relative to the housing.

An arcuate conductive segment 28 is secured to the underside of the plate 14, and is here shown as concentric with the aperture 6 in the housing bottom wall 8. The segment 28 may comprise a strip of copper or the like having a portion 30 bent up at C and so as to pass through an aperture 32 in the plate 14, the portion 30 being bent to extend over the upper surface of the plate 14 and then to project up therefrom, the upwardly projecting portion 34 being bifurcated or otherwise constructed to facilitate the attachment of an electrical lead thereto. At one or more points along the length of the segment 28, tabs 36 are provided bent up to extend through apertures 38 in the plate 14 and then over the upper surface of the plate 14. A comparable tab 40 is also provided at the other end of the segment 28. Said other segment end also carries a downwardly extending stop finger 42 which may be formed integrally with the strip 28 and bent downwardly therefrom, leaving the slot 43 shown in Fig. 1.

A member generally designated 44 is rotatably mounted on the underside of the insulating plate 14 concentrically with the segment 28. That member comprises a conductive wiper arm 46 and a driven arm 48 connected by means of a hub 50. The entire member 44 is preferably formed of some resilient and electrically conductive material. The hub 50 is retained between conductive washers 52 and conductive rivet 54 or the like journals the member 44 on the plate 14. A conductive element 56 having terminal lugs 58 is mounted on the upper surface of the plate 14 and makes electrical connection with the conductive rivet 54, and through that rivet to the wiper arm 46. The wiper arm 46 is resiliently biased upwardly so as to engage the undersurface of the plate 14 and, when appropriately rotated, so as to engage and slide along the conductive segment 28, a protrusion 49 being provided on the wiper arm 46 where it is adapted to slide over the segment 28 in order to facilitate said sliding movement and to ensure effective electrical connection between the arm 46 and the segment 28.

A driving element 60 in the form of a wheel or gear is rotatably mounted in the housing 2, that element being here shown as rotated by shaft 62 which extends out through bearing 64, the bearing 64 in turn sealing the opening 6 in the bottom housing wall 8. Of course, any other means for rotating the element 60 could be employed. This element 60 has a raised cam rim 66 the upper surface 68 of which constitutes a driving surface notched at one point 70 thereof. The arm 48 is resiliently urged downwardly against the driving surface 68, and at its lower end is provided with a foot 72 curved corresponding to the notch 70 so as to seat therein. The curvature of the notch 70 and the foot 72 is sufficiently shallow so that the interengagement between the driven part defined by the foot 72 and the driving portion defined by the notch 70 will release when any substantial resistance to further rotation is exerted upon the arm 48.

Figures 4, 4A:
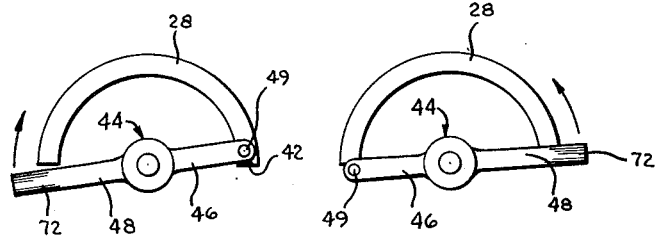
Fig. 4 is a schematic view showing the relative positions of the wiper arm and conductive segment during operation of the system in its normal or forward direction.
Fig. 4A is a view similar to Fig. 4 but showing the relative positions of the parts when the system is operated in reverse direction and at the point when the circuit through the switch is broken.

As here illustrated, operation of the system in a normal or forward direction will cause the driving element 60 to rotate in a clockwise direction as viewed in Figs. 1, 4 and 4A. When this occurs, if the foot 72 is not already in the notch 70, the driving surface 68 of the driving element 60 will slide over the foot 72 until the foot falls into the notch 70. Thereafter the arm 48, and hence the entire member 44, will be carried along with the driving element 60 and caused to rotate clockwise. Eventually the wiper arm 46 will move onto and along the segment 28, thus producing an electrical connection between the two and hence a closed electrical circuit between the terminal portions 34 and 58. The wiper arm 46 will continue to move along the segment 28 until it comes up against the stop finger 42, which is interposed in its path of travel. The finger 42 will positively prevent further rotation of the wiper arm 46, and hence of the entire member 44, in a clockwise direction. However, the driving element 60 will continue to rotate clockwise. As a result, the operative driving connection between the element 60 and the member 44 will yield, the foot 72 on the arm 48 moving out of the slot 70 and onto the driving surface 68, sliding thereover and snapping into and out of the notch 70 as the driving element continues to rotate. The relative positions of the member 44 and segment 28 at this time are shown in Fig. 4.

If now the external system be caused to move in the opposite or reverse direction, the driving element 60 will be caused to rotate in a counter-clockwise direction. It will have no appreciable effect upon the member 44 until it has rotated sufficiently for the notch 70 to come opposite the foot 72. When that occurs the foot 72 will fall into the notch and, there being no positive resistance to rotation of the member in a counterclockwise direction, the driving element 60 will carry the member 44 around with it causing the wiper arm 46 to move along the segment 28 away from the stop finger 42. Eventually, as shown in Fig. 4A, the wiper arm 46 will be moved off of the segment 28, the electrical connection between them will be broken, and hence the electrical circuit between terminals 44 and 58 will be broken. The breaking of this circuit can be caused to actuate any desired control device, such as a brake, a relay, or even the driving motor itself, and will operate to stop the system or perform any other desired function. The precise point in the cycle of operation in the system, and hence in the cycle of rotation of the driving element 60, at which time the electrical connection between the wiper arm 46 and the segment 28 is broken, may be adjusted within limits by rotative adjustment of the insulating plate 14 relative to the housing 2, that plate carrying the segment 28.

Figure 5:
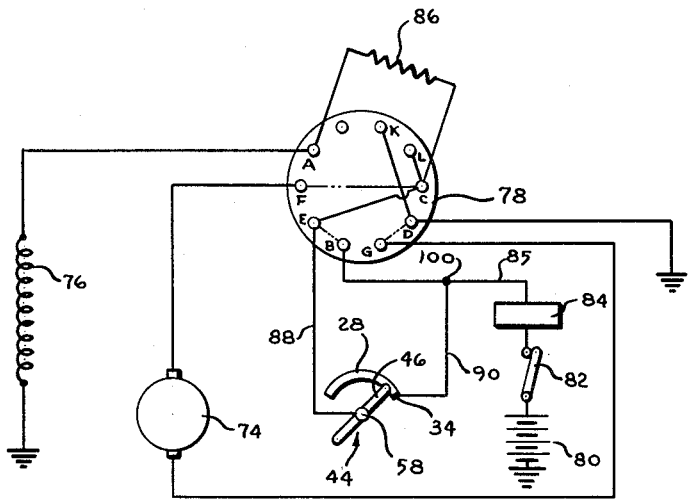
Fig. 5 is a circuit diagram of one motor control system incorporating said switch, showing the system in operation in its normal or forward direction.
Figure 6:
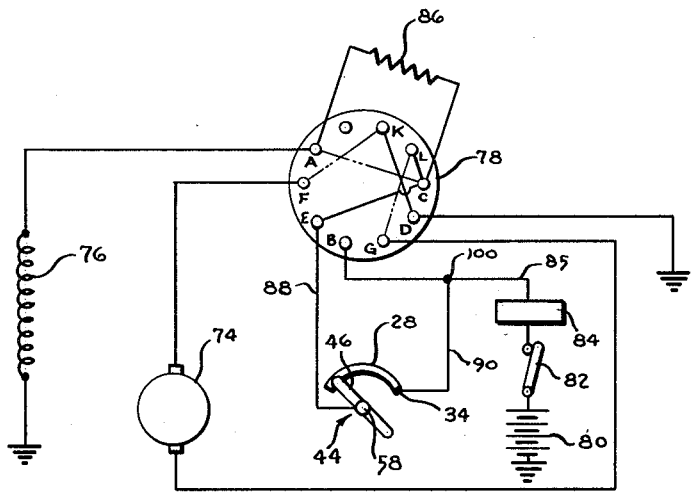
Fig. 6 is a view similar to Fig. 5 but showing the system operating in reverse direction just prior to the time at which the circuit through the switch is opened.

Figs. 5 and 6 are diagrams of a circuit for controlling the speed and direction of operation of a reversible electric motor and illustrates one manner in which the switch of the present invention can be incorporated into such a system. Fig. 5 discloses the circuit connections when the motor is operating in its normal or forward direction, the switch of the present invention being shown in a position corresponding to that of Fig. 4. Fig. 6 shows the circuit connections when the motor is operated in its opposite or reverse direction, the switch of the present invention being shown in a position which it will assume very shortly before the circuit therethrough is broken.

The motor comprises an armature 74 and a field winding 76, the motor being of the shunt type and its direction of rotation being determined by the relative directions of the currents passing through the armature 74 and the field 76 respectively. A reversing and, if desired, a speed control switch 78 is also shown. A battery 80 or other source of unidirectional electric power has its positive end connected to terminal point B on the switch 79 via a switch 82, circuit breaker or fuse 84, and the lead 85. The negative end of the battery 80 may be grounded. One end of the field winding 76 is grounded and the other end is connected to terminal point A on the switch 78. Opposite ends of the armature 74 are connected respectively to the terminal points F and G. Terminal point D is connected to ground. If desired, a speed control resistor 86 may be connected between the terminal points A and C. Permanent connections are provided between the terminal points L and C and the terminal points K and D. The switch terminal 58, electrically connected to the switch member 44 and particularly to the wiper arm 46 thereof, is connected to terminal point E by means of lead 88, the terminal point C also being permanently connected to the terminal point E. The switch terminal 34, electrically connected to the conductive segment 28, is connected by lead 90 to point 100 on the lead 85.

When the motor is connected for high speed operation in the forward direction, connections are made within the switch 78 as indicated by the dot-dash lines in Fig. 5, those connections being between terminal points C and F, D and G, and B and E respectively. The circuit through the field coil 76 from ground may be traced through the battery 80, the switch 82, the circuit breaker 84, the lead 85, terminal B, terminal E, terminal C, the resistor 86, terminal A, and the field coil 76 back to ground. The circuit through the armature 74 may be traced from ground through the battery 80 and to the terminal point C as in the case of the field coil 76, and then through terminal point F, the armature 74, and terminal points G and D back to ground. The switch defined by the member 44 and segment 28 is short-circuited, and hence even if the circuit through that switch is open the circuits to the field 76 and armature 74 of the motor will nevertheless be completed, and the motor will commence to operate in its forward direction, and at high speed, because of the presence in the circuit of the resistor 86, which reduces the current flowing through the field winding 76.

If low speed operation is desired, the internal connections within the switch 78 will be modified by including a connection between terminal points F and A. This will effectively short out the resistor 86, the current flowing through the field coil 76 will increase, and the speed of rotation of the motor will correspondingly decrease. This condition is not specifically illustrated.

To reverse the motor, connections are set up within the switch 78 as illustrated in Fig. 6, those connections being between terminal points G and L, F and K, and A and C respectively. Now the circuit to the field coil 76 can be traced from ground through the battery 80, the switch 82, the fuse 84, the lead 85 up to point 100, the lead 90, the conductive segment 78, the wiper arm 46, lead 88, terminal point E, terminal point C, terminal point A, and the field coil 76 back to ground. The resistor 86 is not included in this circuit, and consequently the motor will operate at low speed. It will be noted that the direction of current flow through the field coil 76 is the same as for operation in a forward direction. The circuit through the armature 74 may be traced from ground to the terminal point C as was the case with the circuit for the field coil 76, then terminal point L, terminal point G, through the armature 74 to terminal point F and thence to terminal points K and D and back to ground. Current will therefore pass through the armature 74 in the reverse direction when compared to the circuit of Fig. 5, thus causing the motor to rotate in a reverse direction. It will be noted that the switch defined by the segment 28 and the wiper arm 46 and the member 44 is in series between the battery 80 and both the armature 74 and the field winding 76. Consequently the motor will be energized only for so long as the wiper arm 46 and the segment 28 are in engagement. When the driving element 60 has rotated the member 44 in a counterclockwise direction sufficiently to move the wiper arm 46 off of the segment 28, the motor will be de-energized and will come to a stop.

The significant fact to note in connection with the stopping of the motor during its movement in reverse is that the amount of such reverse movement will be dependent upon two factors, the length of the segment 28 and the particular point in its normal operation at which the motor is reversed. Thus, if the motor is reversed at the precise moment when the foot 72 of the arm 48 is within the notch 70 on the driving surface 66 of the driving element 60, then the motor will continue to operate in reverse only long enough to cause the driving element 60 to rotate through an arc equal to that of the segment 28. This represents the minimum degree of reverse movement permitted. If, on the other hand, the motor should be reversed at an instant before the notch 70 on the driving surface 68 of the driving element 60 moves opposite the foot 72 on the arm 48, then the motor will be permitted to operate in reverse until the driving element 60 has made almost a complete turn in its reverse direction, at which time the foot 72 will fall into the notch 70, the motor then continuing to operate in a reverse direction for the distance described in the previous example. This latter example represents the maximum degree of reverse movement permitted by the switch. These two extremes have been set forth with respect to the rotation of the driving element 60. The degree of rotation of the motor, and of the system controlled thereby, will be correspondingly related thereto in accordance with the gear train or other driving connection interposed between the motor and the driving element 60.

In Figs. 5 and 6 the switch of the present invention has been disclosed as directly controlling the energization of the motor when it is operating in reverse. It will be understood that it could be employed in many other ways, either to control auxiliary equipment, energize warning lights or relays, or in any other desired manner. Only one embodiment of the switch has been here specifically shown and described, but obvious variations could be made in its specific structure, specifically different yieldable operative connections could be employed between the driving element 60 and the driven member 44, more than one notch 70 or its equivalent could be provided in the driving surface 68 if the desired functioning of the control system should so dictate, and numerous other changes and modifications could be made, all within the spirit of the present invention as defined in the following claims.

I claim:

1. A switch comprising a frame, a conductive segment thereon, a member movable with respect to said frame and having a conductive wiper arm engageable with and movable along said segment, separate electrical connections to said segment and said arm, a movable driving element, and a yieldable operative connection between said driving element and said member, said operative connection comprising a first part movable with said driving element and a second part movable with said member, said parts being substantially freely movable relative to one another except when said parts are in a limited number of particular predetermined relative positions, said parts yieldably operatively engaging only when in said relative positions, said first part then driving said second part and hence said member except when said member is held against movement, in which latter case said operative engagement between said parts yields, said yieldable operative connection being effective to cause said member to move with said driving element only when said member and element are in a limited number of particular predetermined relative positions, said operative connecting being substantially ineffective in all other relative positions of said member and said element, and means operatively connected to said member for positively restraining it against rotation after it has engaged and moved along said segment to a predetermined degree, whereby electrical connection between said wiper arm and said segment is effectuated and maintained when said element is rotated in one direction, rotation of said element in said other direction causing said wiper arm to move off said segment and thus break the electrical connection therebetween.

2. A switch comprising a frame, a conductive segment thereon and having a stop at one end thereof, a member movable with respect to said frame and having a conductive wiper arm engageable with and movable along said segment in the direction of said stop, said wiper arm engaging said stop after it has traversed a predetermined portion of said segment, separate electrical connections to said segment and said arm, a movable driving element, and a yieldable operative connection between said driving element and said member, said operative connection comprising a first part movable with said driving element and a second part movable with said member, said parts being substantially freely movable relative to one another except when said parts are in a limited number of particular predetermined relative positions, said parts yieldably operatively engaging only when in said relative positions, said first part then driving said second part and hence said member except when said member is held against movement, in which latter case said operative engagement between said parts yields, said yieldable operative connection being effective to cause said member to move with said driving element only when said member and element are in a limited number of particular predetermined relative positions, said operative connection being substantially ineffective in all other relative positions of said member and said element, and means operatively connection between said wiper arm and said segment is effectuated and maintained when said element is rotated in one direction, rotation of said element in said other direction causing said wiper arm to move off said segment and thus break the electrical connection therebetween.

3. A switch comprising a frame, a conductive segment thereon, a member rotatable with respect to said frame and having a conductive wiper arm engageable with and movable along said segment, separate electrical connections to said segment and said arm, a rotatable driving element, and a yieldable operative connection between said driving element and said member, said operative connection comprising a first part movable with said driving element and a second part movable with said member, said parts being substantially freely movable relative to one another except when said parts are in a limited number of particular predetermined relative positions, said parts yieldably operatively engaging only when in said relative positions, said first part then driving said second part and hence said member except when said member is held against movement, in which latter case said operative engagement between said parts yields, said yieldable operative connection being effective to cause said member to move with said driving element only when said member and element are in a limited number of particular predetermined relative positions, said operative connection being substantially ineffective in all other relative positions of said member and said element, and means operatively connected to said member for positively restraining it against rotation after it has engaged and moved along said segment to a predetermined degree, whereby electrical connection between said wiper arm and said segment is effectuated and maintained when said element is rotated in one direction, rotation of said element in said other direction causing said wiper arm to move off said segment and thus break the electrical connection therebetween.

4. The switch of claim 3, in which said first part comprises a driving surface on said driving element and said second part comprises a driven arm operatively connected to said wiper arm and resiliently urged against said surface, said driven arm being substantially freely slidable over a portion of said surface so that movement of said surface is not imparted to said driven arm, said driven arm having a part releasably interengageable with another portion of said surface, said releasably interengageable arm part and surface portion, when engaged, causing said driven arm to move with said element when said driven arm is free to move, said interengageable part and portion releasing when said driven arm is restrained against movement, thereby permitting said element to move independently of said wiper arm.

5. The switch of claim 3, in which said wiper arm and driven arm are integral, both formed of a resilient conductive material, and journalled for rotation concentrically of said segment, said segment being substantially arcuate.

6. A switch comprising a frame, a conductive segment thereon and having a stop at one end thereof, a member rotatable with respect to said frame and having a conductive wiper arm engageable with and movable along said segment in the direction of said stop, said wiper arm engaging said stop after it has traversed a predetermined portion of said segment, separate electrical connections to said segment and to said arm, a rotatable driving element, and a yieldable operative connection between said driving element and said member, said operative connection comprising a first part movable with said driving element and a second part movable with said member, said parts being substantially freely movable relative to one another except when said parts are in a limited number of particular predetermined relative positions, said parts yieldably operatively engaging only when in said relative positions, said first part then driving said second part and hence said member except when said member is held against movement, in which latter case said operative engagement between said parts yields, said yieldable operative connection being effective to cause said member to move with said driving element only when said member and element are in a limited number of particular predetermined relative positions, said operative connection being substantially ineffective in all other relative positions of said member and said element, whereby electrical connection between said wiper arm and said segment is effectuated and maintained when said element is rotated in one direction, rotation of said element in said other direction causing said wiper arm to move off said segment and thus break the electrical connection therebetween.

7. The switch of claim 1, in which said segment is adjustably mounted on said frame, whereby its position relative to said wiper arm may be varied.

8. The switch of claim 3, in which said segment is rotatably adjustably mounted on said frame, whereby its position relative to said wiper arm may be varied.

9. The switch of claim 1, in which said first part comprises a driving surface on said driving element and said second part comprises a driven arm operatively connected to said wiper arm and resiliently urged against said surface, said driven arm being substantially freely slidable over a portion of said surface so that movement of said surface is not imparted to said driven arm, said driven arm having a part releasably interengageable with another portion of said surface, said releasably interengageable arm part and surface portion, when engaged, causing said driven arm to move with said element when said driven arm is free to move, said interengageable part and portion releasing when said driven arm is restrained against movement, thereby permitting said element to move independently of said wiper arm.

10. A switch comprising a housing, a driving element rotatable therein and having a driving surface, an insulating plate in said housing, an arcuate conductive segment secured to said plate, a member rotatably mounted in said housing substantially concentrically with said segment and including a pair of arms, one of conductive material movable onto and off of said segment, the other directed toward and resiliently engageable with said driving surface, separate electrical connections to said segment and said one arm, means operatively connected to said member for positively limiting its rotation in a direction such that said one arm moves onto and along said segment, said means being effective after said arm has moved therealong to a predetermined degree, said other arm being substantially freely slidable over a portion of said driving surface so that movement of said surface is not imparted to said driven arm, said driven arm having a part releasably interengageable with another portion of said surface, said releasably interengageable arm part and surface portion, when engaged, causing said other arm to move with said driving element when said other arm is free to move, said interengageable part and portion releasing when said other arm is restrained against movement, thereby permitting said driving element to move independently of said arms.

11. The switch of claim 10, in which said housing comprises a bottom part and a cover therefor, said bottom part having an upper edge, said plate resting on said upper edge, said cover being secured to said pottom part and engaging said plate to hold it against said upper edge.

12. The switch of claim 11, in which a gasket is interposed between said plate and said upper edge.

13. The switch of claim 11, in which said cover is slotted, said plate having a finger extending through said slot, movement of said finger along said slot varying the rotative position of said plate, and hence of said segment, relative to said one arm.

14. The switch of claim 10, in which said rotation-limiting means comprises a projection extending from said plate into the path of movement of one of said arms.

15. The switch of claim 10, in which said rotation-limiting means comprises a projection integral with said segment and extending therefrom into the path of movement of said one arm.

16. The switch of claim 10, in which said plate is rotatably adjustable on said housing, whereby the rotative position of said segment relative to said one arm may be varied.

17. The switch of claim 10, in which said housing is slotted, said plate having a finger extending through said slot, movement of said finger along said slot varying the rotative position of said plate, and hence of said segment, relative to said one arm.

18. A motor control arrangement comprising a reversible electric motor, a source of electrical power, and connections between said source and said motor including a reversing switch for controlling the direction of rotation of said motor and an auxiliary control circuit including a switch comprising a frame, a conductive segment thereon, a member movable with respect to said frame and having a conductive wiper arm engageable with and movable along said segment, separate electrical connections to said segment and said arm, a movable driving element, and a yieldable operative connection between said driving element and said member effective to cause said member to move with said element except when said member is held against movement, in which latter case said operative connection yields, and means operatively connected to said member for positively restraining it against rotation after it has engaged and moved along said segment to a predetermined degree, whereby electrical connection between said wiper arm and said segment is effectuated and maintained when said element is rotated in one direction, rotation of said element in said other direction causing said wiper arm to move off said segment and thus break the electrical connection therebetween, said segment and said wiper arm being connected in series so as to constitute a circuit making or breaking instrumentality, said driving element being operatively connected to said motor so as to be reversibly moved thereby, said reversing switch rendering said auxiliary control circuit inoperative when said motor is caused to rotate in one direction and connecting said auxiliary control circuit in series between said motor and said source of power when said motor is caused to rotate in the other direction, thereby ensuring that said motor will be de-energized at a particular point or points in its cycle after it has been caused to rotate in said other direction.

19. A motor control arrangement comprising a reversible electric motor, a source of electrical power, and connections between said source and said motor including a reversing switch for controlling the direction of rotation of said motor and an auxiliary control circuit including a switch comprising a frame, a conductive segment thereon, a member rotatable with respect to said frame and having a conductive wiper engageable with and movable along said segment, separate electrical connections to said segment and said arm, a rotatable driving element, and a yieldable operative connection between said driving element and said member effective to cause said member to rotate with said element except when said member is held against rotation, in which latter case said operative connection yields, and means operatively connected to said member for positively restraining it against rotation after it has engaged and moved along said segment to a predetermined degree, whereby electrical connection between said wiper arm and said segment is effectuated and maintained when said element is rotated in one direction, rotation of said element in said other direction causing said wiper arm to move off said segment and thus break the electrical connection therebetween, said segment and said wiper arm being connected in series so as to constitute a circuit making or breaking instrumentality, said driving element being operatively connected to said motor so as to be reversibly rotated thereby, said reversing switch rendering said auxiliary control circuit inoperative when said motor is caused to rotate in one direction and connecting said auxiliary control circuit in series between said motor and said source of power when said motor is caused to rotate in the other direction, thereby ensuring that said motor will be de-energized at a particular point or points in its cycle after it has been caused to rotate in said other direction.

References Cited in the file of this patent

UNITED STATES PATENTS

| | | |
|---|---|---|
| 625,232 | Wurts | May 16, 1899 |
| 1,911,021 | Gunther et al. | May 23, 1933 |